United States Patent [19]
Fujibayashi

[11] Patent Number: 5,980,045
[45] Date of Patent: Nov. 9, 1999

[54] IMAGE FORMING APPARATUS

[75] Inventor: Kazuo Fujibayashi, Kawasaki, Japan

[73] Assignee: Canon Kabushiki Kaisha, Tokyo, Japan

[21] Appl. No.: 08/865,624

[22] Filed: May 30, 1997

[30]        Foreign Application Priority Data

Jun. 3, 1996　[JP]　Japan ................................... 8-162370
　Jul. 19, 1996　[JP]　Japan ................................... 8-208905

[51] Int. Cl.⁶ ............................................... G03B 21/14
[52] U.S. Cl. ........................................ 353/101; 362/277
[58] Field of Search .................................. 353/102, 101, 353/100, 38, 69; 362/277, 278, 280, 282, 323, 319

[56]               References Cited
           U.S. PATENT DOCUMENTS

| | | | |
|---|---|---|---|
| 5,046,838 | 9/1991 | Iwasaki | 353/101 |
| 5,120,125 | 6/1992 | Behr | 353/102 |
| 5,187,509 | 2/1993 | Iwasaki | 353/101 |
| 5,467,207 | 11/1995 | Forkner et al. | 353/38 |
| 5,479,224 | 12/1995 | Yasugaki et al. | 353/101 |
| 5,515,121 | 5/1996 | Fujibayashi | 353/81 |
| 5,645,334 | 7/1997 | Tejima et al. | 353/101 |

FOREIGN PATENT DOCUMENTS 2-244134　9/1990　Japan .
3-25744　2/1991　Japan .

*Primary Examiner*—William Dowling
*Attorney, Agent, or Firm*—Fitzpatrick, Cella, Harper & Scinto

[57]                ABSTRACT

An image forming apparatus includes an illuminating device for illuminating a projection image. The illuminating device includes a light source having of a collector-mirror-incorporated lamp, an adapter lens capable of being mounted in or dismounted out of an optical path, and a field lens capable of moving on the optical axis. A projection lens projects the projection image under illumination of the illuminating device onto a projection surface.

16 Claims, 8 Drawing Sheets

IMAGE FORMING APPARATUS

BACKGROUND OF THE INVENTION

1. Field of the Invention

The present invention relates to an image forming apparatus and, more particularly, to an image forming apparatus suitably applicable with microfilm readers or microfilm reader-printers. The image forming apparatus is arranged to observe an enlarged image projected onto a screen surface by a projection lens from a reduced projection image of microfilm or the like and to project and record the enlarged projection image on a surface of a recording medium (a light-receiving medium) such as a line sensor (CCD) or a photosensitive member.

2. Related Background Art

The normal image forming apparatus including the microfilm readers have an observation system for enlarging and projecting the projection image (image information) of a microfilm or the like, which includes a record reduced images, onto the screen surface by the projection lens and a recording system (or a reading system) for projecting and recording the projection image on the surface of line sensor or photosensitive member by the projection lens.

Projection magnifications of the conventional microfilm reader-printers and the like as the image forming apparatus of this type range from 7 times to 50 times and the screen-side NA (numerical aperture) of the projection lens are set to be identical so as to maintain brightness constant on the screen regardless of the projection magnifications. Therefore, the film-side NA are small at low projection magnifications, whereas the film-side NA are large at high projection magnifications.

Many illumination optical systems of such microfilm reader-printers and the like use a collector-lamp-incorporated mirror (a lamp with a collector mirror) as a light source in order to increase the efficiency of light source. This collector-mirror-incorporated lamp was arranged so that a hole was provided at the center of the collector mirror to set the lamp therein. Therefore, the light near the optical axis was not used and the illumination efficiency was lowered by the decrease of illumination of that light.

A variety of proposals have been made heretofore, for example in the bulletin of Japanese Laid-open Patent Application No. 2-244134, the bulletin of Japanese Laid-open Patent Application No. 3-25744, and so on, as to the image forming apparatus (the illumination systems) for relieving the influence of the hole at the center of this collector mirror. The illumination systems proposed in these bulletins were arranged to move a small-size lens of a condenser lens system against movement of the pupil position of the projection lens.

In recent years, the image forming apparatus of microfilm reader-printers and the like are required to permit digital reading with a recording medium (solid state image sensing device) such as a line sensor (CCD), for example, so as to take in an image as data of personal computer. Since this line sensor has narrow latitude of quantity-of-light sensitivity, for example different from the photosensitive drum, it has a problem that the line sensor reads even small quantity-of-light unevenness. It is possible to correct the sensitivity of quantity-of-light unevenness for each pixel of line sensor, but, for example with use of a rotation prism (an image-inverting prism), there are problems that rotation of the rotation prism changes the direction of the quantity-of-light unevenness and that it is difficult to handle fine quantity-of-light unevenness practically because of limitations of capacity of memory devices for storing sensitivity correction values or the like. Therefore, the quantity-of-light unevenness and change of absolute quantity of light are desirably as little as possible.

SUMMARY OF THE INVENTION

An object of the present invention is to provide an image forming apparatus that uses a collector-mirror-incorporated lamp as a light source and that, in observing an enlarged and projected image on the screen surface by the projection lens from a reduced projection image of microfilm or the like as illuminated by illuminating means comprising the light source or in recording (or reading) the enlarged image by projecting it onto the surface of the recording medium (light-receiving medium) such as the line sensor (CCD) or the photosensitive member, can take in the light in sufficient quantity as relieving the influence of a hole of an ellipsoidal mirror when the projection magnification of the projection lens is low, can make the projection lens take in the light in sufficient quantity when the projection magnification is high, and can minimize the quantity-of-light unevenness at each projection magnification, by properly arranging the elements constituting the illuminating means.

An image forming apparatus of the present invention is an image forming apparatus for projecting a projection image under illumination of illuminating means onto a projection surface such as a screen surface or a surface of a recording medium by a projection lens, wherein the illuminating means is arranged to have a light source comprising a collector-mirror-incorporated lamp, an adapter lens capable of being mounted in or dismounted out of an optical path, and a field lens capable of moving on the optical axis and wherein the adapter lens is mounted in the optical path or dismounted out of the optical path, depending upon a projection magnification of the projection lens.

Particularly, the above image forming apparatus of the present invention may have either of such features:

that the adapter lens has a negative refracting power, the adapter lens is mounted in the optical path when the projection magnification of the projection lens is a low magnification, and the adapter lens is dismounted out of the optical path when the projection magnification of the projection lens is a high magnification;

that the field lens has a positive refracting power and moves on the optical axis, depending upon a position of the pupil of the projection lens on the projection image side; and that the field lens is a Fresnel lens.

Another image forming apparatus of the present invention is an image forming apparatus for projecting a projection image under illumination of illuminating means onto a projection surface such as a screen surface or a surface of a recording medium by a projection lens, wherein the illuminating means is arranged to have a light source comprising a collector-mirror-incorporated lamp, an adapter lens having a negative refracting power, capable of being mounted in or dismounted out of an optical path, and a field lens having a positive refracting power, capable of moving on the optical axis, wherein when a projection magnification of the projection lens is a low magnification, the adapter lens is mounted in the optical path and the field lens is moved on the optical axis, depending upon a position of the pupil of the projection lens on the projection image side, and wherein when the projection magnification of the projection lens is a high magnification, the adapter lens is dismounted out of the optical path and the field lens is moved on the optical axis, depending upon the position of the pupil of the projection lens on the projection image side.

Particularly, the image forming apparatus of the present invention is characterized in that the field lens is a Fresnel lens.

Another image forming apparatus of the present invention is an image forming apparatus for projecting a projection image under illumination of illuminating means onto a projection surface such as a screen surface or a surface of a recording medium by a projection lens, wherein the illuminating means is arranged to have a light source comprising a collector-mirror-incorporated lamp, first and second, two adapter lenses capable of being mounted in or dismounted out of an optical path, and a field lens capable of moving on the optical axis, and wherein the first and second, two adapter lenses each are mounted in or dismounted out of the optical path, depending upon a projection magnification of the projection lens.

Particularly, the above image forming apparatus of the present invention may have either of such features:

that the first adapter lens has a positive refracting power, the second adapter lens has a negative refracting power, only the second adapter lens is mounted in the optical path when the projection magnification of the projection lens is a low magnification, only the first adapter lens is mounted in the optical path when the projection magnification of the projection lens is a high magnification, and the first and second, two adapter lenses are mounted in the optical path when the projection magnification of the projection lens is an intermediate magnification;

that the field lens has a positive refracting power and moves on the optical axis, depending upon a position of the pupil of the projection lens on the projection image side; and that the field lens is a Fresnel lens.

Another image forming apparatus of the present invention is an image forming apparatus for projecting a projection image under illumination of illuminating means onto a projection surface such as a screen surface or a surface of a recording medium by a projection lens, wherein the illuminating means is arranged to have a light source comprising a collector-mirror-incorporated lamp, a first adapter lens having a positive refracting power, capable of being mounted in or dismounted out of an optical path, a second adapter lens having a negative refracting power, capable of being mounted in or dismounted out of the optical path, and a field lens having a positive refracting power, capable of moving on the optical axis, wherein when a projection magnification of the projection lens is a low magnification, only the second adapter lens is mounted in the optical path and the field lens is moved on the optical axis, depending upon a position of the pupil of the projection lens on the projection image side; when the projection magnification of the projection lens is a high magnification, only the first adapter lens is mounted in the optical path and the field lens is moved on the optical axis, depending upon the position of the pupil of the projection lens on the projection image side; when the projection magnification of the projection lens is an intermediate magnification, the first and second, two adapter lenses are mounted in the optical path and the field lens is moved on the optical axis, depending upon the position of the pupil of the projection lens on the projection image side.

Particularly, the above image forming apparatus of the present invention is characterized in that the field lens is a Fresnel lens.

Another image forming apparatus of the present invention is an image forming apparatus for projecting a projection image under illumination of illuminating means onto a projection surface such as a screen surface or a surface of a recording medium by a projection lens, wherein the illuminating means is arranged to have a light source comprising a collector-mirror-incorporated lamp, a fixed, negative lens having a negative refracting power, a positive lens having a positive refracting power, capable of being mounted in or dismounted out of an optical path, and a field lens capable of moving on the optical axis, wherein when a projection magnification of the projection lens is a low magnification, the positive lens is dismounted out of the optical path; when the projection magnification of the projection lens is a high magnification, the positive lens is mounted in the optical path; and when the refracting powers of the negative lens and the positive lens are defined as $\phi_N$, $\phi_P$, respectively, they satisfy the following conditions:

$$|\phi_N| < \phi_P \text{ and } \phi_N < 0 \tag{1}$$

Particularly, the above image forming apparatus of the present invention is characterized in that the field lens has a positive refracting power and moves on the optical axis, depending upon a position of the pupil of the projection lens on the projection image side.

Another image forming apparatus of the present invention is an image forming apparatus for projecting a projection image under illumination of illuminating means onto a projection surface such as a screen surface or a surface of a recording medium by a projection lens, wherein the illuminating means is arranged to have a light source comprising a collector-mirror-incorporated lamp, a variable-power lens refracting power of which is variable, and a field lens capable of moving on the optical axis, and wherein when a projection magnification of the projection lens is a low magnification, said variable-power lens, is changed so that the variable-power lens has a negative refracting power; when the projection magnification of the projection lens is a high magnification, said variable-power lens is changed, so that the variable-power lens has a positive refracting power.

The above image forming apparatus of the present invention is characterized in that the field lens has a positive refracting power and moves on the optical axis, depending upon a position of the pupil of the projection lens on the projection image side.

DETAILED DESCRIPTION OF THE PREFERRED EMBODIMENTS

Figure 1:
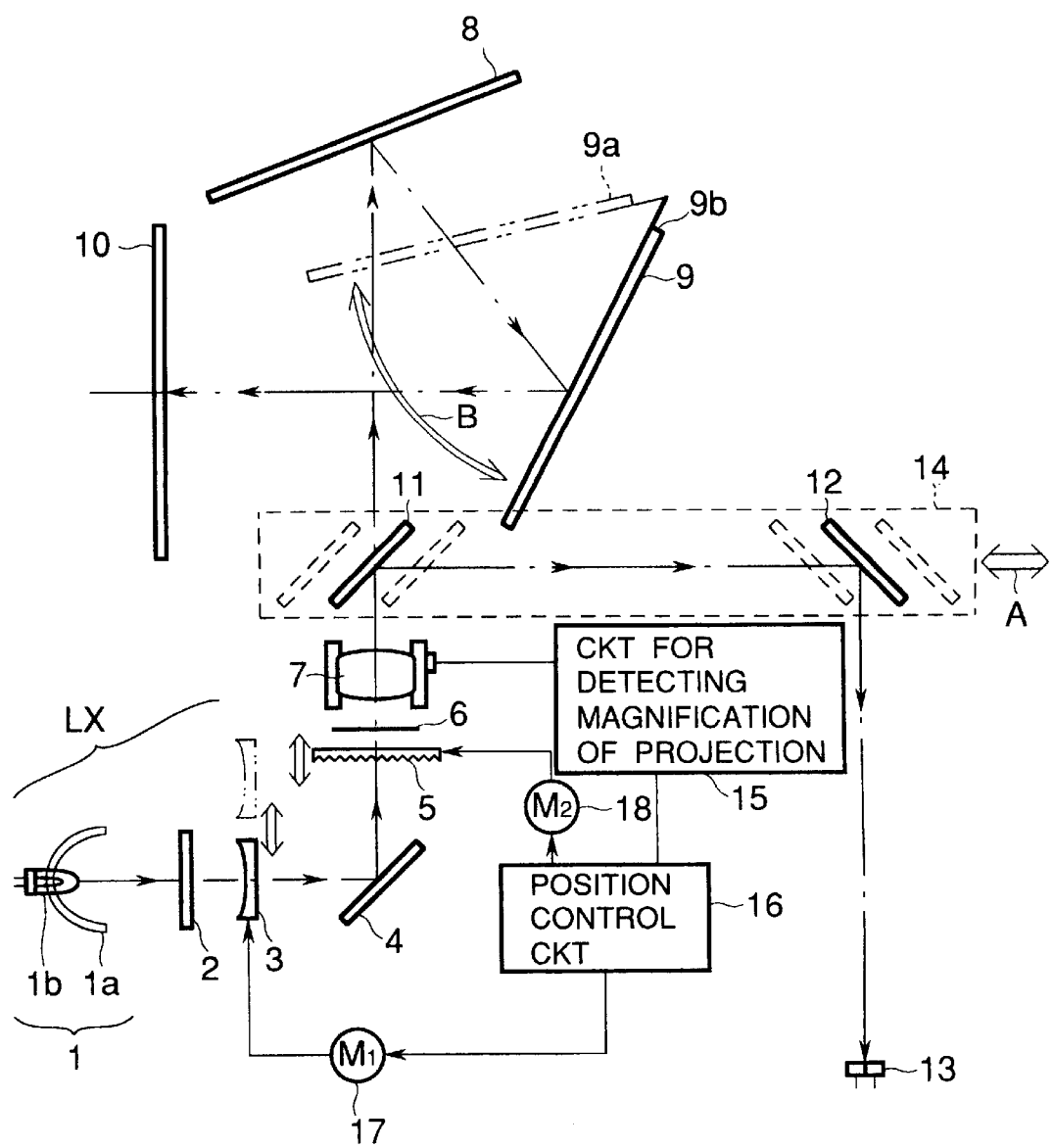
FIG. 1 is a schematic diagram of the major part of Embodiment 1 of the image forming apparatus according to the present invention.

FIG. 1 is a schematic diagram of the major part of Embodiment 1 of the image forming apparatus according to the present invention.

In the same figure reference numeral 1 designates a light source, which is a collector-mirror-incorporated lamp in which a halogen lamp 1b and an ellipsoidal mirror 1a are incorporated. This collector-mirror-incorporated lamp 1 is constructed in such a configuration that a bulb of halogen lamp 1b is inserted in a hole formed in the central part of ellipsoidal mirror 1a. Numeral 2 denotes a heat-insulating glass plate.

Numeral 3 represents an adapter lens having a negative refracting power, which is capable of being mounted in or dismounted out of the optical path. The adapter lens 3 is arranged so as to be capable of being automatically mounted in or dismounted out of the optical path by control means 16, based on projection magnification information of the projection lens 7 (information as to the type of the projection lens and as to the projection magnification) detected by detecting means 15 as described hereinafter. Numeral 4 stands for a cold mirror which works with the heat-insulating glass plate 2 to remove the infrared components from the light radiated from the light source 1 so as to suppress a rise of temperature on the surface of projection image 6 described below. Numeral 5 denotes a field lens having a positive refracting power and being capable of moving, which is a Fresnel lens. The field lens 5 is placed near the projection image 6 and is arranged so as to be capable of automatically moving along the optical axis by the control means 16, based on the projection magnification information of the projection lens 7 (the information as to the type of the projection lens and as to the projection magnification) detected by the detecting means 15 as described below. In the present embodiment the elements of reference numerals 1, 2, 3, 4, and 5 compose the illuminating means (illumination system) LX.

Numeral 6 designates a transmission-type projection image (image information) which is, for example, of a microfilm or the like. Numeral 7 represents a projection lens, which magnifies and projects the projection image 6 onto a surface of screen 10 or onto a surface of line sensor (CCD) 13 as a recording medium (solid state image sensing device). The projection lens 7 may be a zoom lens and in this case the projection magnification information changes depending upon zooming.

Numeral 15 denotes a projection magnification detecting circuit as the detecting means, which detects the projection magnification information of the projection lens 7. Numeral 16 is a position control circuit as the control means, which controls driving motors 17, 18, based on a signal from the projection magnification detecting circuit 15, thereby mounting the adapter lens 3 in the optical path or dismounting the adapter lens 3 out of the optical path, and moving (or driving) the field lens 5 on the optical axis.

Numeral 14 is a scanning section for digital reading, capable of moving, which has mirrors 11, 12 for digital reading and which moves as indicated by the arrow A in the drawing so as to be located in the optical path upon reading of projection image 6 or so as to be retracted out of the optical path upon observation. Numeral 13 is a recording medium for digital reading, which is, for example, a line sensor (CCD) in which plural pixels are aligned normal to the plane of the drawing. The recording medium may be a photosensitive drum.

Numeral 8 denotes a reflecting mirror for observation and 9 a rotating mirror for observation capable of rotating, which rotates to the position 9b upon observation or rotates to the position 9a upon reading (upon recording), as indicated by the arrow B in the figure. Numeral 10 is a screen.

In the present embodiment the light radiated from the halogen lamp 1b is collected once by the ellipsoidal mirror 1a, thereafter the light is made to pass through the heat-insulating glass 2 and then through the adapter lens 3, which is capable of being mounted or dismounted depending upon the projection magnification information of the projection lens 7, and to be reflected by the cold mirror 4, and thereafter the light is guided through the field lens 5 capable of moving depending upon the projection magnification information of the projection lens 7, thus illuminating an effective illumination area of the projection image 6. In the present embodiment the elements are set so that the light from the light source is converged (or focused) near the position of the entrance pupil of the projection lens 7, that is, so as to achieve Köhler illumination.

Upon observation for observing the projection image 6 on the surface of screen 10, the light having passed through the projection lens 7 is guided via the reflecting mirror 8 and rotating mirror 9 onto the surface of screen 10, thereby forming an enlarged projection image thereon.

When the projection image is read by the line sensor 13, the scanning section 14 for digital reading moves as indicated by the arrow A in the figure so as to be located in the optical path, whereby the light having passed through the projection lens 7 is reflected by the mirrors 11, 12 for digital reading so as to be incident onto the surface of line sensor 13. Then the line sensor 13 digitally reads the projection image 6.

In the present embodiment, the projection magnification detecting circuit 15 detects the projection magnification information of the projection lens 7, the position control circuit 16 automatically mounts the adapter lens 3 in the optical path or dismounts it out of the optical path and moves the field lens 5 by a predetermined amount in a direction along the optical axis through the corresponding driving motor 17, 18, respectively, based on the thus detected information.

Figure 2A:
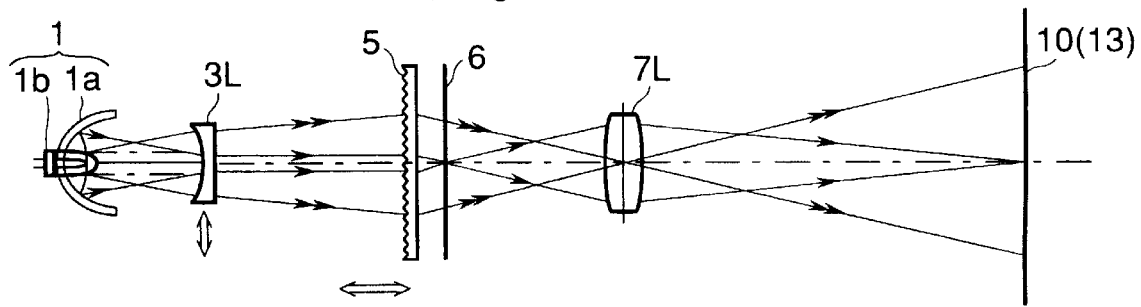
FIGS. 2A, 2B and 2C are schematic diagrams of the major part of the optical system in the main part of Embodiment 1 of the present invention.
Figure 2B:
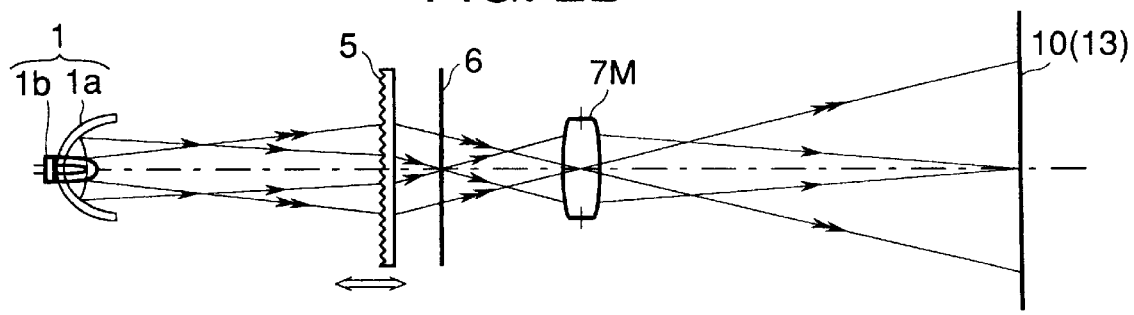
Figure 2C:
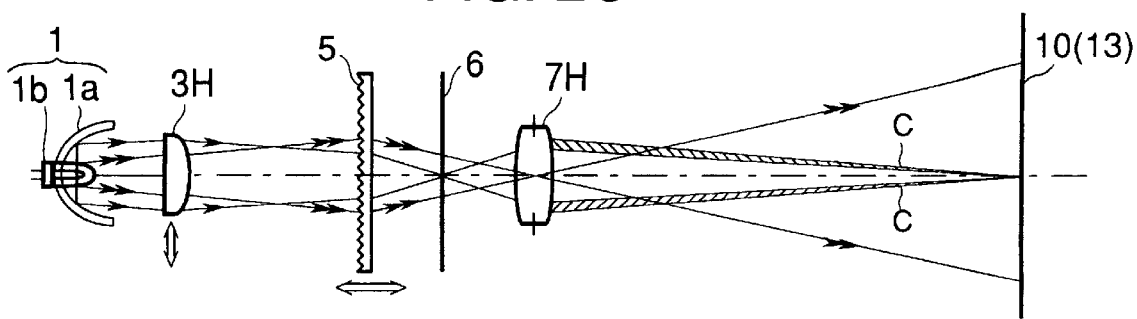

FIGS. 2A, 2B, and 2C are schematic diagrams of the major part where the optical system in the major part of FIG. 1 is developed. FIG. 2A shows an optical arrangement when the projection magnification of the projection lens is a low magnification, FIG. 2B shows an optical arrangement when the projection magnification of the projection lens is an intermediate magnification, and FIG. 2C shows an optical arrangement when the projection magnification of the projection lens is a high magnification. In FIGS. 2A, 2B and 2C the same elements as those shown in FIG. 1 are denoted by the same reference symbols.

In the drawings, 7L, 7M, or 7H represents the projection lens for low magnification, for intermediate magnification, or for high magnification, respectively, 3H a first adapter lens having a positive refracting power for high magnification, and 3L a second adapter lens having a negative refracting power for low magnification.

In the image forming apparatus of this type, it is necessary to keep NA of the projection lens 7 on the screen 10 side constant, in order to keep brightness always constant on the screen 10. As a result, NA on the film 6 side becomes small at low magnifications and NA on the film 6 side becomes large at high magnifications. Accordingly, the width of illumination of beams illuminating respective points on the film 6 is narrow at low magnifications, but wide at high magnifications.

When the ellipsoidal-mirror-incorporated lamp having the efficient light-collecting performance is used as a light source, the effective light reflected by the ellipsoidal mirror is decreased at low projection magnifications because of the influence of the hole at the center of the ellipsoidal mirror, while on the other hand, the effective light is decreased at high projection magnifications because the illumination width of the light beam corresponding to the stop aperture of the projection lens becomes wider than the illumination width of the reflected light by the ellipsoidal mirror.

Thus, the present embodiment solves the above problems by mounting or dismounting the first and second, two adapter lenses 3H, 3L in or out of the optical path, based on the projection magnification information of the projection lens 7 detected by the projection magnification detecting circuit 15, for satisfying either of the illumination conditions as shown in FIGS. 2A, 2B, and 2C.

Specifically, at low magnifications, as shown in FIG. 2A, the second adapter lens 3L of the negative refracting power is mounted in the optical path to widen the illumination width (range) of the light beam reflected by the ellipsoidal mirror 1a, thereby relieving the influence of the hole of the ellipsoidal mirror 1a. At high magnifications, as shown in FIG. 2C, the second adapter lens 3L is dismounted out of the optical path and the first adapter lens 3H having the positive refracting power is mounted in the optical path to widen the illumination width of the light beam incident to the stop aperture of the projection lens 7H, thereby effectively converting the light reflected by the ellipsoidal mirror 1a into the illumination light.

With increasing refracting power the first adapter lens 3H will make the effective light quantity of the illumination light closer to the stop aperture into the projection lens 7H, but, on the other hand, the width of the light beam reflected by the ellipsoidal mirror 1a becomes narrower, which will increase the influence of the hole of the ellipsoidal mirror 1a. Accordingly, at high magnifications the light cannot be projected by the quantity of light indicated by the hatched part c shown in FIG. 2C, whereby the projection surface becomes a little darker in some cases than at low magnifications. In general, high-density film is rarely used at high magnifications. Therefore, the optimum illumination condition can also be achieved at high magnifications by only dismounting the second adapter lens 3L out of the optical path without using the first adapter lens 3H.

At intermediate magnifications, as shown in FIG. 2B, the optimum illumination condition is achieved by dismounting the first adapter lens 3H and the second adapter lens 3L out of the optical path.

Figure 3:
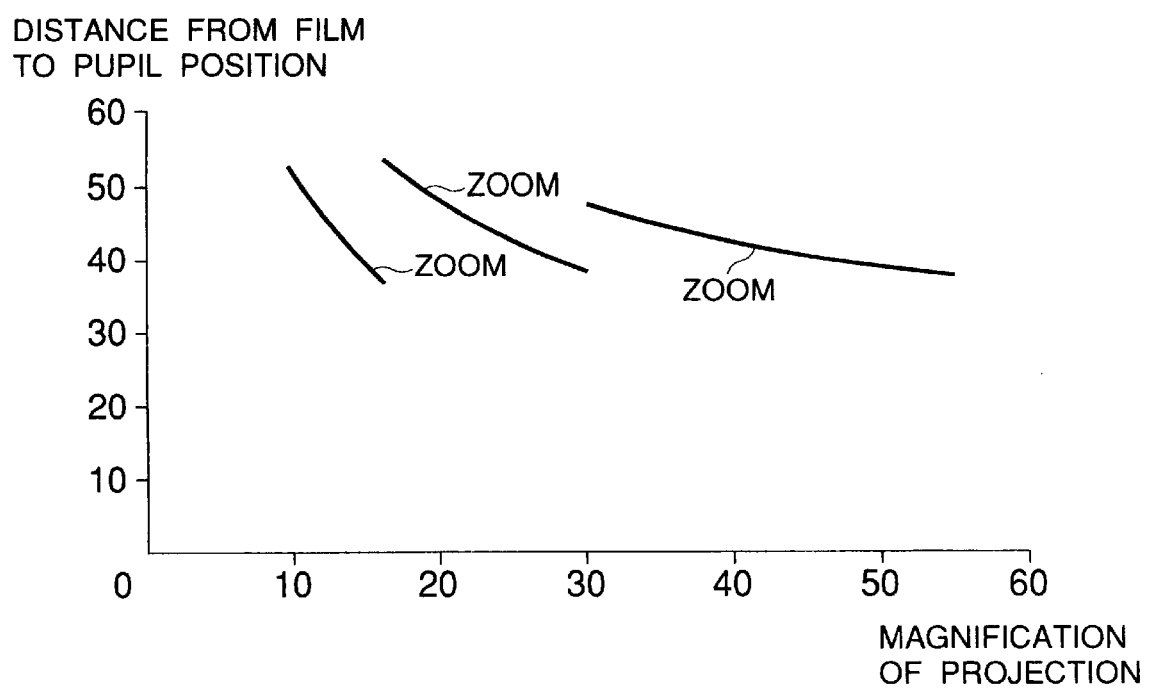
FIG. 3 is an explanatory drawing to show positional changes of the pupil of the projection lens associated with the present invention.

Further, in the present embodiment the optimum illumination condition is maintained by moving the field lens 5 on the optical axis depending upon the position of the pupil of the projection lens 7 on the microfilm 6 side in synchronism with the mounting or dismounting of the first and second, two adapter lenses 3H, 3L as shown in FIGS. 2A, 2B, and 2C. Especially, when the projection magnification is low, it is necessary to satisfy the Köhler illumination condition, because the image range of microfilm 6 is wide. Since in FIGS. 2A, 2B, and 2C the projection lens 7 is assumed to be a single lens, the principal point position and the pupil position of the projection lens 7 are considered to coincide with each other. However, for example, when the projection lens is a zoom lens, the pupil position and the magnification do not always correspond. For example, when the projection lens is a zoom lens, the pupil position shows the change as shown in FIG. 3. In the same drawing consideration is made so as not to cause a great change of the pupil position. In FIG. 3 the abscissa represents the magnification of projection while the ordinate the distance from the film to the pupil position.

Described below is Numerical Example 1 in Embodiment 1 of the present invention.

Numerical Example 1

Pupil position of projection lens (distance from film to pupil): 37 to 53.5 (mm)

Length from film to light source: 239.5 (mm)

Ellipsoidal mirror

Distance from light source to apex of ellipsoid: 8.5 (mm)

Focal point of light source (distance from light source to focal point): 56 (mm)

Refracting power

Field lens (Fresnel lens of positive refracting power): +1/53.6

Negative adapter lens: −1/223

Positive adapter lens: +1/287

Distance between lenses (paraxial value)

Distance between film and field lens: 13.4 to 31.4 (mm)

Distance between field lens and negative lens (positive lens): 127 to 145 (mm)

Distance between negative lens and light source: 77.3 (mm)

When in the above configuration the projection magnification of the projection lens 7 is changed, for example, from 9.5 times to 55 times as shown in FIG. 3, the change in the quantity of projection light is kept as small as possible by mounting or dismounting the two types of adapter lenses 3H, 3L in or out of the optical path depending upon the projection magnification and by changing the position of the field lens 5 on the optical axis depending upon the pupil position of the projection lens 7. By this, the optimum illumination condition is always maintained irrespective of the projection magnification in the present embodiment.

Further, the weight of the entire apparatus is reduced in the present embodiment, because the field lens 5 is the Fresnel lens as described above.

Figure 4A:
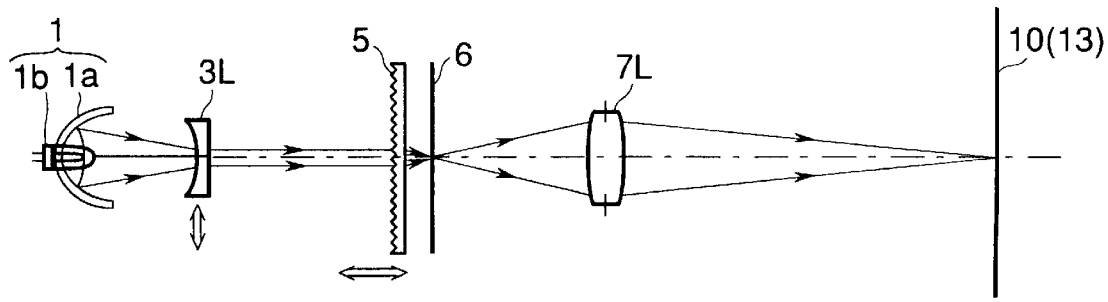
FIGS. 4A, 4B and 4C are schematic diagrams of the major part of the optical system in the main part of Embodiment 2 of the image forming apparatus according to the present invention.
Figure 4B:
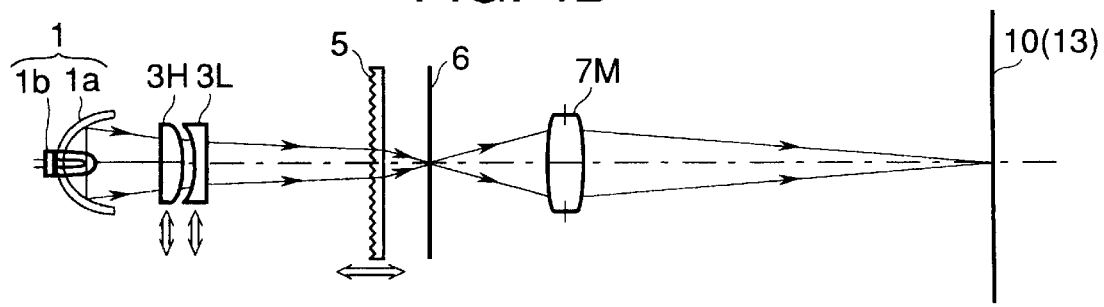
Figure 4C:
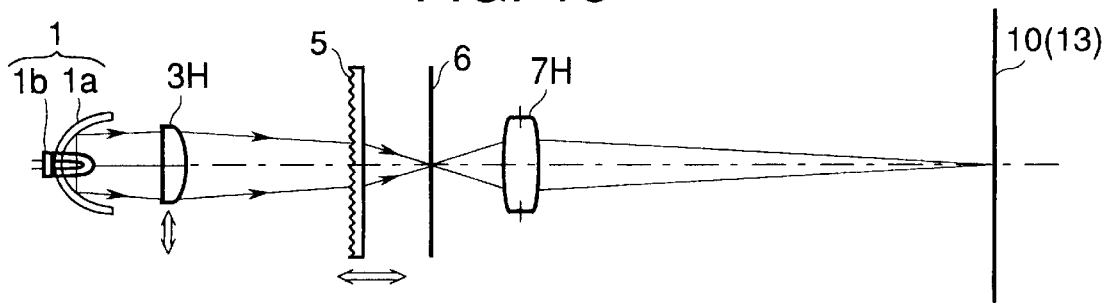

FIGS. 4A, 4B, and 4C are schematic major-part diagrams of the major part of Embodiment 2 of the image forming apparatus according to the present invention. FIG. 4A shows an optical arrangement when the projection magnification of the projection lens is a low magnification, FIG. 4B shows an optical arrangement when the projection magnification of the projection lens is an intermediate magnification, and FIG. 4C shows an optical arrangement when the projection magnification of the projection lens is a high magnification. In the figures the same elements as those shown in FIGS. 2A, 2B, and 2C are denoted by the same reference symbols.

The present embodiment is different from Embodiment 1 described above in that when the projection magnification of the projection lens 7 is an intermediate magnification, the first adapter lens 3H of positive refracting power and the second adapter lens 3L of negative refracting power both are mounted in the optical path. The other configuration and optical action are substantially the same as in Embodiment 1 described above, thereby achieving the same effects.

Specifically, the present embodiment is arranged so that when the projection magnification of the projection lens 7 is a low magnification, only the second adapter lens 3L is mounted in the optical path and the field lens 5 is moved on the optical axis depending upon the pupil position of the projection lens 7L on the projection image 6 side; so that when the projection magnification is a high magnification, the second adapter lens 3L is dismounted out of the optical path, only the first adapter lens 3H is mounted in the optical path, and the field lens 5 is moved on the optical axis depending upon the pupil position of the projection lens 7H on the projection image 6 side; and so that when the projection magnification is an intermediate magnification, the first and second, two adapter lenses 3H, 3L are mounted in the optical path and the field lens 5 is moved on the optical axis depending upon the pupil position of the projection lens 7M on the projection image 6 side.

Namely, the present embodiment is arranged so that when the projection magnification is an intermediate magnification, the first and second, two adapter lenses 3H, 3L are mounted in the optical path; when the magnification is changed from this state to a low magnification, the first adapter lens 3H is dismounted out of the optical path; when the magnification is changed to a high magnification, the second adapter lens 3L is dismounted out of the optical path; and so that the field lens 5 is moved on the optical axis depending upon the pupil position of the projection lens 7 on the projection image 6 side in synchronism with the mounting or dismounting of the two types of adapter lenses 3H, 3L in or out of the optical path. By this, the optimum illumination condition is always maintained irrespective of the projection magnification of the projection lens 7.

In the present embodiment the two types of adapter lenses 3H, 3L can be configured with considerably weak refracting power.

As described above, the present invention can achieve the image forming apparatus that uses the collector-mirror-incorporated lamp as a light source and that, in observing an enlarged and projected image on the screen surface by the projection lens from the reduced projection image of microfilm or the like under illumination of the illuminating means comprising the light source or in recording (or reading) the enlarged image as projected onto the surface of the recording medium (light-receiving medium) such as the line sensor (CCD) or the photosensitive member, can relieve the influence of the hole of the ellipsoidal mirror when the projection magnification of the projection lens is a low magnification and can take in the light in as much quantity as possible at the stop aperture of the projection lens when the projection magnification is a high magnification, by properly arranging the elements constituting the illuminating means, whereby the optimum illumination condition with little change in quantity of light can be always maintained irrespective of the projection magnification, from the low magnification to the high magnification.

Further embodiments of the present invention will be described.

Figure 5:
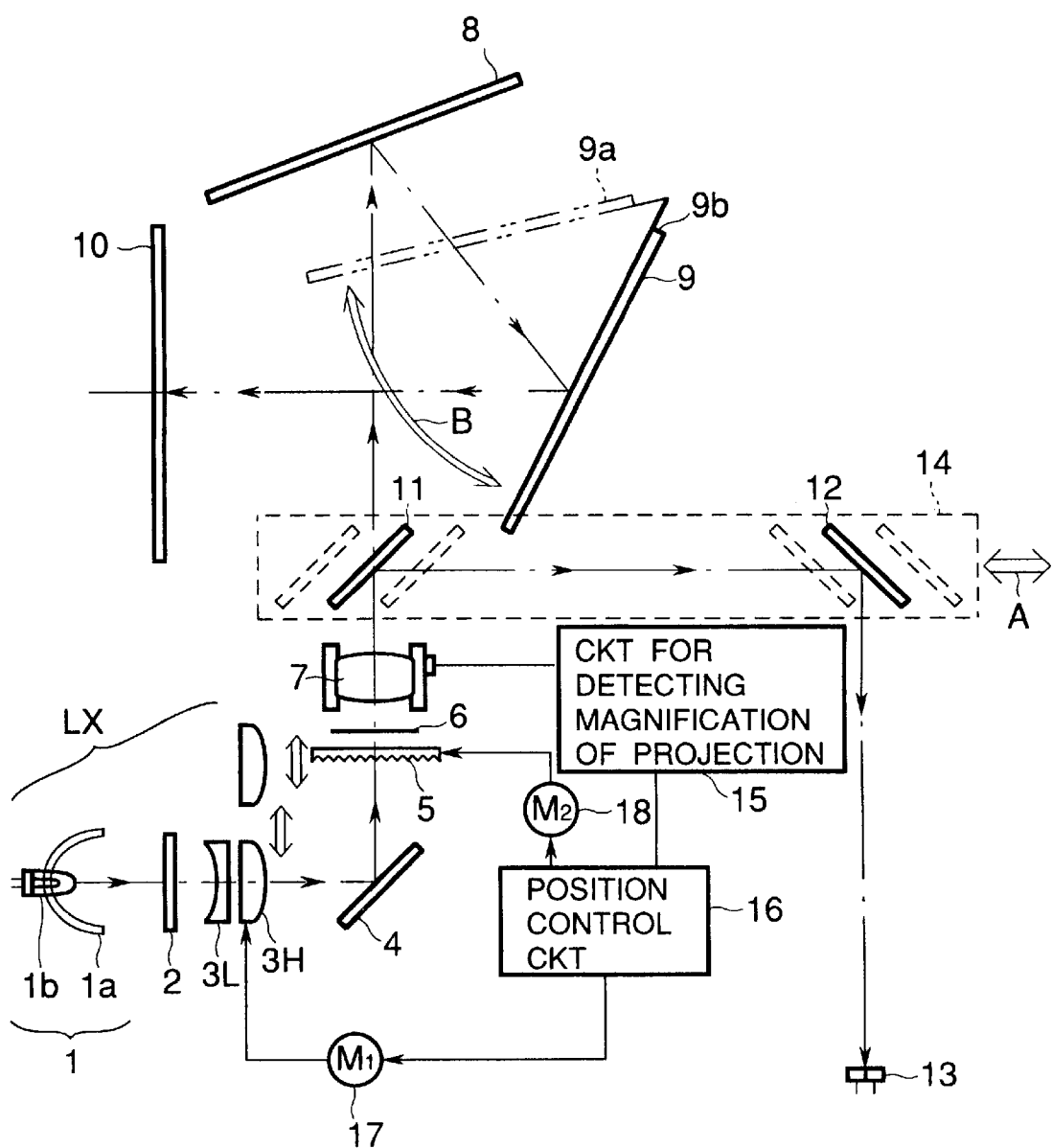
FIG. 5 is a schematic diagram of the major part of Embodiment 3 of the image forming apparatus according to the present invention.

FIG. 5 is a schematic diagram of the major part of Embodiment 3 of the image forming apparatus according to the present invention.

In the same figure reference numeral 1 designates a light source, which is a collector-mirror-incorporated lamp in which halogen lamp 1b and ellipsoidal mirror 1a are incorporated. This collector-mirror-incorporated lamp 1 is constructed in such a configuration that a bulb of halogen lamp 1b is inserted in the hole formed at the central part of the ellipsoidal mirror 1a. Numeral 2 represents a heat-insulating glass plate.

Symbol 3L represents a fixed, negative lens having a negative refracting power. Symbol 3H is a positive lens (adapter lens) having a positive refracting power, which is capable of being mounted in or dismounted out of the optical path. The positive lens 3H is arranged so as to be automatically mounted in the optical path or dismounted out of the optical path by the control means 16, based on the projection magnification information of the projection lens 7 (the information as to the type of projection lens 7 and as to the projection magnification) detected by the detecting means 15 as described below.

Numeral 4 stands for a cold mirror which works with the heat-insulating glass plate 2 to remove the infrared components from the light radiated from the light source 1 so as to suppress a rise of temperature on the surface of projection image 6 described below.

Numeral 5 denotes a field lens having a positive refracting power and being capable of moving, which is a Fresnel lens. The field lens 5 is placed near the projection image 6 and is arranged so as to be capable of automatically moving along the optical axis by the control means 16, based on the projection magnification information of the projection lens 7 (the information as to the type of the projection lens and as to the projection magnification) detected by the detecting means 15 as described below. In the present embodiment the elements of reference symbols 1, 2, 3L, 3H, 4, and 5 compose the illuminating means (illumination system) LX.

Numeral 6 designates a transmission-type projection image (image information) which is, for example, of a microfilm or the like. Numeral 7 represents a projection lens, which magnifies and projects the projection image 6 onto the surface of screen 10 or onto the surface of line sensor (CCD) 13 as a recording medium (solid state image sensing device). The projection lens 7 may be a zoom lens and in this case the projection magnification information changes depending upon zooming.

Numeral 15 denotes a projection magnification detecting circuit as the detecting means, which detects the projection magnification information of the projection lens 7. Numeral 16 is a position control circuit as the control means, which controls driving motors 17, 18, based on a signal from the projection magnification detecting circuit 15, thereby mounting the positive lens (adapter lens) 3H in the optical path or dismounting the positive lens 3H out of the optical path, and moving (or driving) the field lens 5 on the optical axis.

Numeral 14 is a scanning section for digital reading, capable of moving, which has mirrors 11, 12 for digital reading and which moves as indicated by the arrow A in the drawing so as to be located in the optical path upon reading of projection image 6 or so as to be retracted out of the optical path upon observation. Numeral 13 is a recording medium for digital reading, which is, for example, a line sensor (CCD) in which plural pixels are aligned normal to the plane of the drawing. The recording medium may be a photosensitive drum.

Numeral 8 denotes a reflecting mirror for observation and 9 a rotating mirror for observation capable of rotating, which rotates to the position 9b upon observation or rotates to the position 9a upon reading (upon recording), as indicated by the arrow B in the figure. Numeral 10 is a screen.

In the present embodiment the light radiated from the halogen lamp 1b is collected once by the ellipsoidal mirror 1a, thereafter the light is made to pass through the heat-insulating glass 2 and the negative lens 3L and then through the positive lens 3H, which is capable of being mounted or dismounted depending upon the projection magnification information of the projection lens 7, and to be reflected by the cold mirror 4, and thereafter the light is guided through the field lens 5 capable of moving depending upon the projection magnification information of the projection lens 7, thus illuminating the effective illumination area of the projection image 6. In the present embodiment the elements are set so that the light from the light source is converged (or focused) near the position of the entrance pupil of the projection lens 7, that is, so as to achieve the Köhler illumination.

Upon observation for observing the projection image 6 on the surface of screen 10, the light having passed through the projection lens 7 is guided via the reflecting mirror 8 and rotating mirror 9 onto the surface of screen 10, thereby forming an enlarged projection image thereon.

When the projection image is read by the line sensor 13, the scanning section 14 for digital reading moves as indicated by the arrow A in the figure so as to be located in the optical path, whereby the light having passed through the projection lens 7 is reflected by the mirrors 11, 12 for digital reading so as to be incident onto the surface of line sensor 13. Then the line sensor 13 digitally reads the projection image 6.

In the present embodiment, the projection magnification detecting circuit 15 detects the projection magnification information of the projection lens 7, the position control circuit 16 automatically mounts the positive lens 3H in the optical path or dismounts it out of the optical path and moves the field lens 5 by a predetermined amount in a direction along the optical axis, through the corresponding driving motor 17, 18, respectively, based on the thus detected information.

Figure 6A:
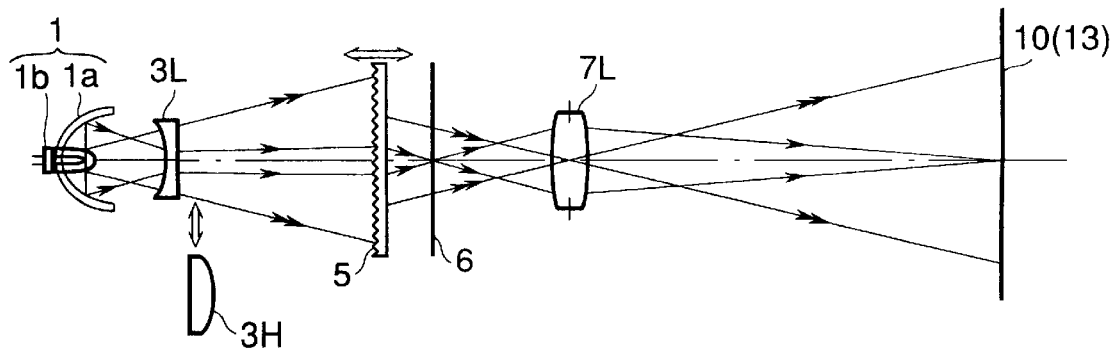
FIGS. 6A and 6B are schematic diagrams of the major part of the optical system in the main part of Embodiment 3 of the present invention.
Figure 6B:
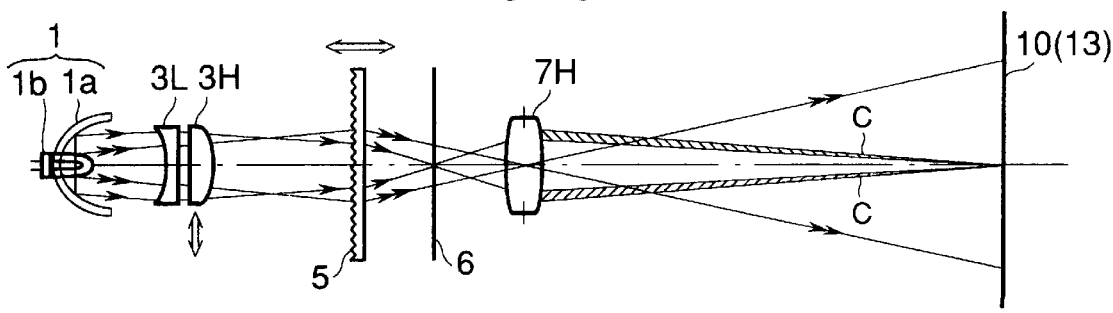

FIGS. 6A and 6B are schematic diagrams of the major part where the optical system in the major part of FIG. 5 is developed. FIG. 6A shows an optical arrangement when the projection magnification of the projection lens is a low magnification and FIG. 6B shows an optical arrangement when the projection magnification of the projection lens is a high magnification. In FIGS. 6A and 6B the same elements as those shown in FIG. 5 are denoted by the same reference symbols.

In the figures, 7L or 7H represents the projection lens for low magnification or for high magnification, respectively.

In the image forming apparatus of this type, it is necessary to keep NA of the projection lens 7 on the screen 10 side constant, in order to keep brightness always constant on the screen 10. As a result, NA on the film 6 side becomes small at low magnifications and NA on the film 6 side becomes large at high magnifications. Accordingly, the width of illumination of beams illuminating respective points on the film 6 is narrow at low magnifications, but wide at high magnifications.

When the ellipsoidal-mirror-incorporated lamp having the efficient light-collecting performance is used as a light source, the effective light reflected by the ellipsoidal mirror is decreased at low projection magnifications because of the influence of the hole at the center of the ellipsoidal mirror, while on the other hand, the effective light is decreased at high projection magnifications because the illumination width of the light beam corresponding to the stop aperture of the projection lens becomes wider than the illumination width of the reflected light beam by the ellipsoidal mirror.

Thus, the present embodiment solves the above problems by mounting or dismounting the positive lens 3H in or out of the optical path, based on the projection magnification information of the projection lens 7 detected by the projection magnification detecting circuit 15, for satisfying either of the illumination conditions as shown in FIGS. 6A and 6B.

Specifically, at low magnifications, as shown in FIG. 6A, the positive lens 3H is dismounted out of the optical path, so that the illumination width (range) of the light beam reflected by the ellipsoidal mirror 1a is expanded by the optical action of the fixed, negative lens 3L, thereby relieving the influence of the hole of the ellipsoidal mirror 1a. At high magnifications, as shown in FIG. 6B, the positive lens 3H is mounted in the optical path so as to expand the illumination width of the light beam incident into the stop aperture of the projection lens 7H, thereby effectively converting the light reflected by the ellipsoidal mirror 1a into the illumination light. Since at this time a total refracting power of the negative lens 3L and the positive lens 3H needs to be positive, the refracting powers of the respective lenses are set so as to satisfy the following conditions:

$$|\phi_N| < \phi_P \text{ and } \phi_N < 0 \qquad (1)$$

where $\phi^N$ is the refracting power of the negative lens 3L and $\phi_P$ is the refracting power of the positive lens 3H.

Condition Equations (1) concern a ratio of the refracting powers of the negative lens 3L and the positive lens 3H. Outside Condition Equations (1) it becomes difficult to widen the illumination width of the light beam incident to the stop aperture of the projection lens 7H, which will make it more difficult to effectively convert the light reflected by the ellipsoidal mirror 1a into the illumination light and which is thus not preferred.

With increasing refracting power the positive lens 3H will make the effective light quantity of the illumination light closer to the stop aperture into the projection lens 7H, but, on the other hand, the width of the light beam reflected by the ellipsoidal mirror 1a becomes narrower, which will increase the influence of the hole of the ellipsoidal mirror 1a. Accordingly, at high magnifications the light cannot be projected by the quantity of light indicated by the hatched part c shown in FIG. 6B, whereby the projection surface becomes a little darker in some cases than at low magnifications.

In the present embodiment the refracting power $\phi_P$ of the positive lens 3H is properly set to satisfy Condition Equations (1) so as not to cause the above problem.

Further, in the present embodiment the optimum illumination condition is maintained by moving the field lens 5 on the optical axis depending upon the position of the pupil of the projection lens 7 on the microfilm 6 side in synchronism with the mounting or dismounting of the positive lens 3H as shown in FIGS. 6A and 6B. Especially, when the projection magnification is low, it is necessary to satisfy the Köhler illumination condition, because the image range of microfilm 6 is wide.

Since in FIGS. 6A and 6B the projection lens 7 is assumed to be a single lens, the principal point position and the pupil position of the projection lens 7 are considered to coincide with each other. However, for example, when the projection lens is a zoom lens, the pupil position and the magnification do not always correspond. For example, when the projection lens is a zoom lens, the pupil position shows the change as shown in FIG. 3 discussed previously. In the same drawing consideration is made so as not to cause a great change of the pupil position. In FIG. 3 the abscissa represents the magnification of projection while the ordinate the distance from the film to the pupil position.

Further, the weight of the entire apparatus is reduced in the present embodiment, because the field lens 5 is the Fresnel lens as described above.

Figure 7A:
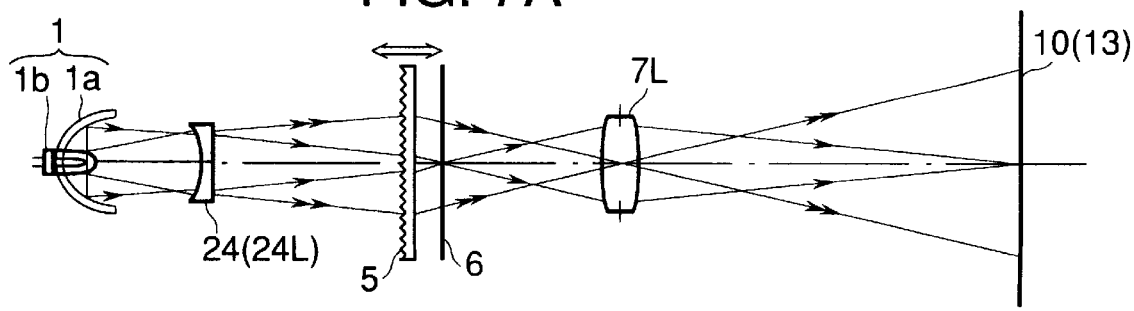
FIGS. 7A, 7B and 7C are schematic diagrams of the major part of the optical system in the main part of Embodiment 4 of the image forming apparatus according to the present invention.
Figure 7B:
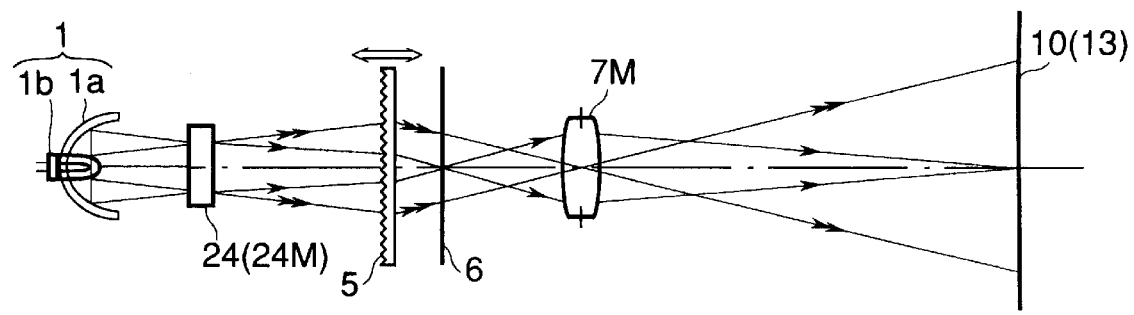
Figure 7C:
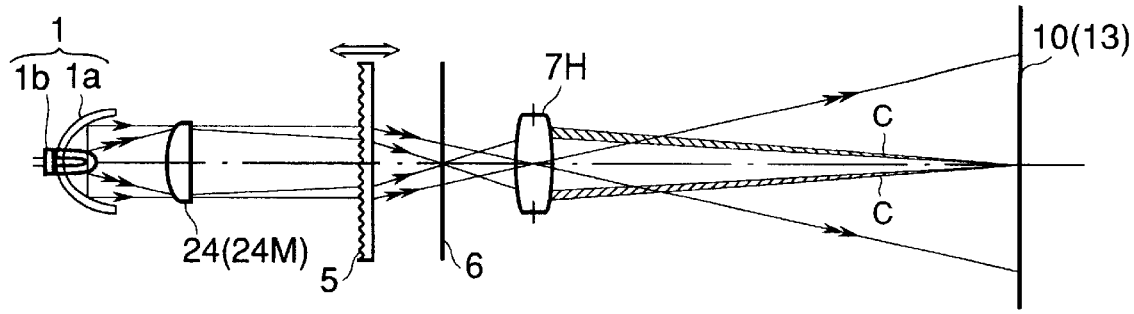

FIGS. 7A, 7B, and 7C are schematic major-part diagrams of the major part of Embodiment 4 of the image forming apparatus according to the present invention. FIG. 7A shows an optical arrangement when the projection magnification of the projection lens is a low magnification, FIG. 7B shows an optical arrangement when the projection magnification of the projection lens is an intermediate magnification, and FIG. 7C shows an optical arrangement when the projection magnification of the projection lens is a high magnification. In the figures the same elements as those shown in FIGS. 6A and 6B are denoted by the same reference symbols.

The present embodiment is different from Embodiment 3 described above in that a variable-power lens (a lens with variable refracting power) 24 is disposed in the optical path, instead of the fixed, negative lens 3L and the positive lens 3H capable of being mounted or dismounted, and in that the refracting power of the variable-power lens 24 is changed (increased or decreased) depending upon the projection magnification of the projection lens 7. The other configuration and optical action are substantially the same as in Embodiment 3 described above, thereby achieving the same effects.

Figure 8A:
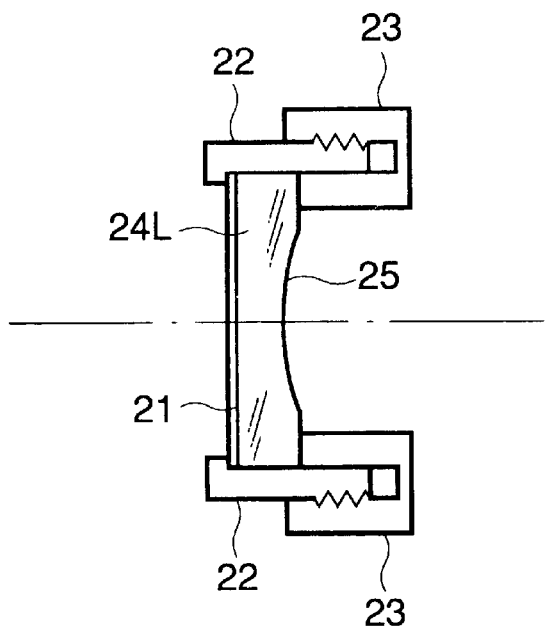
FIGS. 8A and 8B are explanatory drawings of the major part of the variable-power lens shown in FIGS. 7A and 7C.
Figure 8B:
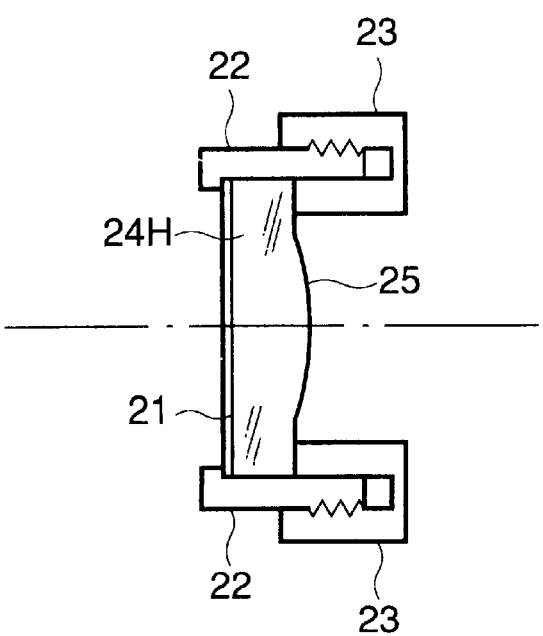

Namely, numeral 24 (24L, 24M, 24H) in the same figures represents the lens with variable refracting power (the variable-power lens). This variable-power lens 24 is, for example, the lens as shown in FIGS. 8A and 8B, wherein a mechanical means pushes or pulls the edge of a silicone rubber member 25 as a transparent, elastic member so as to change the shape of the lens to change the curvature thereof, thereby changing the total refracting power. The variable-power lens 24L, 24H shown in FIG. 8A or 8B, respectively, corresponds to the variable-power lens 24L, 24H shown in FIG. 7A or 7C, respectively.

In FIGS. 8A and 8B numeral 21 designates a plane-parallel glass plate, which also functions to fix one surface of the variable-power lens 24 (24L, 24H). Numeral 22 denotes a fixed lens barrel, and 23 a movable lens barrel. The movable lens barrel 23 is coupled with the fixed lens barrel 22 by threads and the edge of silicone rubber member 25 is pushed or pulled by rotating the movable lens barrel 23. The silicone rubber member 25 has a relatively hard surface layer which is a thin layer, so that the central portion thereof can change to be convex, flat, or concave by the pushing or pulling of the edge.

The present embodiment utilizes this variable-power lens 24 so that when the projection magnification of the projection lens 7 is a low magnification, the variable-power lens 24L is changed into a concave lens to have a negative refracting power, thereby widening the illumination width (range) of the light beam reflected by the ellipsoidal mirror 1a and thus relieving the influence of the hole of the ellipsoidal mirror 1a. When the projection magnification is an intermediate magnification, the variable-power lens 24M is changed into a nearly plane-parallel plate to have no refracting power, whereby the light reflected by the ellipsoidal mirror 1a can be incident into the stop aperture of the projection lens 7 efficiently. When the projection magnification is a high magnification, the variable-power lens 24H is changed into a convex lens to have a positive refracting power, thereby widening the illumination width of the light beam incident to the stop aperture of the projection lens 7 and thereby effectively converting the light reflected by the ellipsoidal mirror 1a into the illumination light.

If the refracting power of the variable-power lens 24 is increased, the effective light quantity of the illumination light will become closer to the stop aperture into the projection lens 7. However, on the other hand, the width of the beam reflected by the ellipsoidal mirror 1a becomes narrower, which makes the beam likely to be affected by the hole of the ellipsoidal mirror 1a. Accordingly, there are some cases in which at high magnifications the projection surface becomes a little darker than at low magnifications, because some light cannot be projected by the quantity of light corresponding to the hatched part c as shown in FIG. 7C. Thus, the present embodiment is arranged to properly change the refracting power of the variable-power lens 24 so as not to cause the above problem.

As described above, the present embodiment can always maintain the illumination system efficient, because the refracting power of the variable-power lens 24 can be changed continuously depending upon the projection magnification without mounting or dismounting the variable-power lens 24 in or out of the optical path.

Further, the present embodiment is arranged to maintain the optimum illumination efficiency by moving the field lens 5 depending upon the pupil position of the projection lens 7 on the microfilm 6 side in synchronism with the change of the refracting power of the variable-power 24 as shown in FIGS. 7A, 7B, and 7C. Particularly, when the projection magnification is a low magnification, it is necessary to satisfy the Köhler illumination condition by moving the field lens 5 to an appropriate position, because the image range of microfilm 6 is wide.

Described below are Numerical Examples 3 and 4 corresponding to Embodiments 3 and 4 of the present invention.

Numerical Example 3

Pupil position of projection lens (distance from film to pupil): 37 to 53.5 (mm)

Length from film to light source: 239.5 (mm)

Ellipsoidal mirror

Distance from light source to apex of ellipsoid: 8.5 (mm)

Focal point of light source (distance from light source to focal point): 56 (mm)

Refracting power

Field lens (Fresnel lens of positive refracting power): +1/53.6

Adapter lens: +1/143.4

Fixed lens: −1/193.7

Distance between lenses (paraxial value)

Distance between film and field lens: 13.4 to 31.4 (mm)

Distance between field lens and adapter lens: 140 to 122 (mm)

Distance between adapter lens and fixed lens: 18.6 (mm)

Distance between fixed lens and light source: 70.2 (mm)

When in the above configuration the projection magnification of the projection lens 7 is changed, for example, from 9.5 times to 55 times as shown in FIG. 3, the change in the quantity of projection light is kept as small as possible by mounting or dismounting the positive lens 3H in or out of the optical path depending upon the projection magnification and by changing the position of the field lens 5 on the optical axis depending upon the pupil position of the projection lens 7. By this, the optimum illumination condition is always maintained irrespective of the projection magnification in the present embodiment.

Numerical Example 4

Pupil position of projection lens (distance from film to pupil): 37 to 53.5 (mm)

Length from film to light source: 239.5 (mm)

Ellipsoidal mirror

Distance from light source to apex of ellipsoid: 8.5 (mm)

Focal point of light source (distance from light source to focal point): 56 (mm)

Refracting power

Field lens (Fresnel lens of positive refracting power): +1/53.6

Variable-power lens: −1/223 to +1/287

Distance between lenses (paraxial value)

Distance between film and field lens: 13.4 to 31.4 (mm)

Distance between field lens and variable-power lens: 127 to 145 (mm)

Distance between variable-power lens and light source: 77.3 (mm)

When in the above configuration the projection magnification of the projection lens is changed, for example, from 9.5 times to 55 times as shown in FIG. 3, the change in the quantity of projection light is kept as small as possible by changing the refracting power of the variable-power lens depending upon the projection magnification and by changing the position of the field lens on the optical axis depending upon the pupil position of the projection lens. By this, the optimum illumination condition is always maintained irrespective of the projection magnification in the present embodiment.

As described above, the present invention can achieve the image forming apparatus that uses the collector-mirror-incorporated lamp as a light source and that, in observing an enlarged and projected image on the screen surface by the projection lens from the reduced projection image of microfilm or the like under illumination of the illuminating means comprising the light source or in recording (or reading) the enlarged image as projected onto the surface of the recording medium (light-receiving medium) such as the line sensor (CCD) or the photosensitive member, can relieve the influence of the hole of the ellipsoidal mirror when the projection magnification of the projection lens is a low magnification and can take in the light in as much quantity as possible at the stop aperture of the projection lens when the projection magnification is a high magnification, by properly arranging the elements constituting the illuminating means, whereby the optimum illumination condition can be always maintained with little change in quantity of light irrespective of the projection magnification, from the low magnification to the high magnification.

What I claim is:

1. An image forming apparatus comprising:

illuminating means for illuminating a projection image, said illuminating means having a light source comprised of a collector-mirror-incorporated lamp, an adapter lens capable of being mounted in or dismounted out of an optical path, and a field lens capable of moving on the optical axis; and a projection lens for projecting said projection image under illumination of said illuminating means onto a projection surface, wherein said adapter lens is mounted in or dismounted out of the optical path, depending upon projection magnification of said projections lens.

2. The image forming apparatus according to claim 1, wherein said projection surface is a screen surface or a surface of a recording medium.

3. The image forming apparatus according to claim 1, wherein said adapter lens has a negative refracting power;

wherein when the projection magnification of said projection lens is a low magnification, said adapter lens is mounted in the optical path and wherein when the projection magnification of said projection lens is a high magnification, said adapter lens is dismounted out of the optical path.

4. A The image forming apparatus according to claim 1, wherein said field lens has a positive refracting power and moves on the optical axis, depending upon a position of a pupil of said projection lens on a projection image side.

5. The image forming apparatus according to claim 1, wherein said field lens comprises a Fresnel lens.

6. The image forming apparatus according to claim 1, wherein said adapter lens comprises a first adapter lens and a second adapter lens.

7. The image forming apparatus according to claim 6.

wherein said first adapter lens has a positive refracting power and said second adapter lens has a negative refracting power;

wherein when the projection magnification of said projection lens is a low magnification, only said second adapter lens is mounted in the optical path;

wherein when the projection magnification of said projection lens is a high magnification, only said first adapter lens is mounted in the optical path; and wherein when the projection magnification of said projection lens is an intermediate magnification, said first adapter lens and said second adapter lens are mounted in the optical path.

8. An image forming apparatus comprising:

illuminating means for illuminating a projection image, said illuminating means having a light source comprised of a collector-mirror-incorporated lamp, a fixed lens, an adapter lens capable of being mounted in or dismounted out of an optical path, and a field lens capable of moving on the optical axis; and a projection lens for projecting said projection image under illumination of said illuminating means onto a projection surface, wherein said adapter lens is mounted in or dismounted out of the optical path, depending upon a projection magnification of said projection lens.

9. The image forming apparatus according to claim 8, wherein said projection surface is a screen surface or a surface of a recording medium.

10. The image forming apparatus according to claim 8, wherein said fixed lens has a negative refracting power and said adapter lens has a positive refracting power;

wherein when the projection magnification of said projection lens is a low magnification, said adapter lens is dismounted out of the optical path and wherein when the projection magnification of said projection lens is a high magnification, said adapter lens is mounted in the optical path.

11. The image forming apparatus according to claim 10, wherein the following conditions are satisfied:

$$|\phi_N| < \phi_P \text{ and } \phi_N < 0$$

where $\phi_N$ is the refracting power of said fixed lens and $\phi_P$ is the refracting power of said adapter lens.

12. The image forming apparatus according to claim 8, wherein said field lens has a positive refracting power and moves on the optical axis, depending upon a position of a pupil of said projection lens on a projection image side.

13. An image forming apparatus comprising:

illuminating means for illuminating a projection image, said illuminating means having a light source comprised of a collector-mirror-incorporated lamp, a lens with variable refracting power, and a field lens capable of moving on the optical axis; and a projection lens for projecting said projection image under illumination of said illuminating means onto a projection surface.

14. The image forming apparatus according to claim 13, wherein said projection surface is a screen surface or a surface of a recording medium.

15. The image forming apparatus according to claim 13, wherein when a projection magnification of said projection lens is a low magnification, said lens with variable refracting power is changed so as to have a negative refracting power; and wherein when the projection magnification of said projection lens is a high magnification, said lens with variable refracting power is changed so as to have a positive refracting power.

16. The image forming apparatus according to claim 13, wherein said field lens has a positive refracting power and moves on the optical axis, depending upon a position of a pupil of said projection lens on a projection image side.

* * * * *

UNITED STATES PATENT AND TRADEMARK OFFICE
CERTIFICATE OF CORRECTION

PATENT NO. : 5,980,045

DATED : November 9, 1999

INVENTOR(S): KAZUO FUJIBAYASHI

It is certified that error appears in the above-identified patent and that said Letters Patent is hereby corrected as shown below:

COLUMN 12:

Line 23, "$\phi^N$" should read --$\phi_N$--.

COLUMN 13:

Line 60, "1a a" should read --1a--.

COLUMN 16:

Line 12, "A" should be deleted.

Signed and Sealed this

Twenty-fourth Day of April, 2001

Attest:

NICHOLAS P. GODICI

Attesting Officer    Acting Director of the United States Patent and Trademark Office